United States Patent [19]
DeLuca et al.

[11] Patent Number: 5,848,270
[45] Date of Patent: Dec. 8, 1998

[54] METHOD AND SYSTEM FOR DETERMINING THE PERFORMANCE CHARACTERISTICS OF A COMPUTER SYSTEM

[75] Inventors: Steven A. DeLuca, San Jose; Andrew Rist, Menlo Park, both of Calif.

[73] Assignee: Oracle Corporation, Redwood Shore, Calif.

[21] Appl. No.: 692,077

[22] Filed: Aug. 2, 1996

[51] Int. Cl.$^6$ .................................................. G06F 9/00
[52] U.S. Cl. ........................................... 395/675; 395/672
[58] Field of Search ................................. 395/670, 675, 395/671, 672; 707/205

[56] References Cited

U.S. PATENT DOCUMENTS

5,072,376  12/1991  Ellsworth ................................. 395/675
5,504,887   4/1996  Malhotra et al. ........................ 707/205

*Primary Examiner*—Maijd A. Banankhah
*Attorney, Agent, or Firm*—Wagner,Murabito&Hao

[57] ABSTRACT

A system and method for modeling the size of a computer system. In one embodiment, the present invention receives selected workload information which indicates the expected performance requirements for a desired computer system. The present invention calculates the busy time and a utilization percentage for a central processing unit which is subjected to the selected workload. The present invention also calculates the minimum amount of memory and the mass storage requirements for a modeled computer system subjected to the selected workload and wherein the modeled computer system is equipped with the aforementioned central processing unit. In so doing, the present invention indicates the processor, memory, and mass storage requirements for a computer system without requiring that the computer system actually be constructed and tested.

29 Claims, 4 Drawing Sheets

METHOD AND SYSTEM FOR DETERMINING THE PERFORMANCE CHARACTERISTICS OF A COMPUTER SYSTEM

TECHNICAL FIELD

This invention pertains to servers for multi-user computer systems. Specifically, the present invention pertains to sizing of a server for a multi-user computing system.

BACKGROUND ART

Since the introduction of multi-user systems and accompanying databases, customers have required a method for predicting the hardware investment needed to run software applications. More specifically, customers have a need to determine precise central processing unit (CPU) requirements, volatile memory requirements (i.e. random access memory (RAM)), and mass storage (e.g. hard disk capacity) requirements. The process of determining the appropriate hardware is referred to as "sizing" the server system. If the server system is not adequately equipped, or is sized too small, the server system can suffer from performance problems, and may be non-functional. On the other hand, if the server system is oversized, the customer will be paying for superfluous hardware and performance capability. Although the following discussion explicitly recites sizing a server system, it will be understood that the discussion also pertains to sizing of various other types of computer systems.

In the prior art, numerous techniques have been employed to size server systems. In one prior art approach, benchmark simulations are used to determine how a particular server system would handle a customer's projected workload. In a benchmark simulation, a server sizing consultant constructs a server system having a particular CPU configuration, RAM content, and hard disk capacity. The system is then run at operating parameters corresponding to the customer's predicted workload. By observing the operation of the server system, the consultant and the customer are able to determine whether such a server system might be suitable for the customer's needs. Often, multiple server systems are actually constructed and operated at the customer's projected workload. The operation efficiency of the multiple systems are then compared so that the customer and the consultant can decide which of the server systems is appropriate for the customer. Although such an approach may indicate what type of server system is suited to the customer's needs, a benchmark simulation is extremely expensive. That is, the cost of constructing the server system combined with the consultant's fee can easily reach several hundreds of thousands of dollars. Moreover, a benchmark simulation requires that at least one server system be physically constructed. Additionally, if a customer seeks to determine, for example, how a particular brand or type of CPU would function, a new server system having that particular brand or type of CPU included therein must be constructed and tested.

As the cost of server systems decrease, the cost effectiveness of benchmark simulations is dramatically diminished. For example, if a server system costs several millions of dollars, spending a few hundred thousand dollars on a benchmark simulation can be justified. However, if a server system costs tens of thousands of dollars, spending a few hundred thousand dollars on a benchmark simulation is no longer feasible. Thus, benchmark simulations are not a feasible sizing approach for many server system purchasers.

In another prior art server system sizing approach, a consultant uses an estimation or comparison method to evaluate the server requirements of a current customer. In such an approach, the consultant seeks to determine whether other users have run applications similar to those of the current customer, and what type of server system was employed by the other users. The consultant then modifies the type of server system employed by the other users in an attempt to create a server system which will meet the particular demands of the current customer. Finding other users whose applications, organizations, and workloads are even remotely related to the needs of the current customer is extremely difficult. Furthermore, attempting to match or even modify a server system used by others to meet the particular needs of a current customer is even more challenging than finding similar users. As a result, server systems created as a result of comparison and modification can very easily be fatally undersized or wastefully oversized.

In the prior art, capacity planning methods exist for determining when an existing server system will reach or exceed the limits of its hardware. When attempting to determine the capacity or expected growth of an existing server system using traditional capacity planning techniques, the performance of the existing server system is monitored to empirically determine performance characteristics. However, prior art capacity planning techniques are unable to determine the hardware investment needed to create a server system. That is, traditional capacity planning methods determine the growth rate of an existing server system, not the hardware requirements for a new server system.

Thus, a need exists for a server sizing system which determines performance characteristics of a particular server system without requiring the construction of that particular server system. A further need exists for a server sizing system which is inexpensive. Still another need also exists for a server sizing system which does not require extensive consultant review of numerous currently operating server systems.

DISCLOSURE OF THE INVENTION

The present invention provides a computer system and method which inexpensively determines performance characteristics of a particular server system without requiring the construction of that particular server system, and which does not require extensive consultant review of numerous currently operating server systems. The present invention also accomplishes the above described tasks with a system and method for modeling the size of a server system.

More specifically, in one embodiment, the present invention receives selected workload information which indicates the expected performance requirements for a desired server system. The present invention calculates the busy time and a utilization percentage for a central processing unit which is subjected to the selected workload. Using these quantities, the present invention determines how many processors will be required for the workload. The present invention also calculates the minimum amount of memory and the mass storage required in a server system equipped with the aforementioned central processing unit and subjected to the selected workload. In so doing, the present invention determines the processor, memory, and mass storage requirements for a server system without requiring that the server system actually be constructed and tested.

In another embodiment, the present invention performs the steps recited in the above described embodiment and then compares the requirements of the modeled server system equipped with the central processing unit and subjected to the selected workload to an existing server system. That is, the present embodiment compares the memory capacity, mass storage capacity, and central processing unit of the existing server system to the requirements of the modeled server system. The present invention then reports whether the existing server system would be able to adequately operate at the expected performance requirements of the modeled server system. As a result, the present invention indicates how various "off-the-shelf" server systems would function when subjected to the workload requirements of the modeled server system. Thus, the present invention allows the performance of various existing server systems to be analyzed without actually running or testing the existing server systems. Although the above description explicitly recites using the present invention to size a server system, the present invention is also well suited for sizing of various other types of computer systems.

Other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "determining", "calculating", "reporting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT SERVER SIZING SYSTEM

Figure 1:
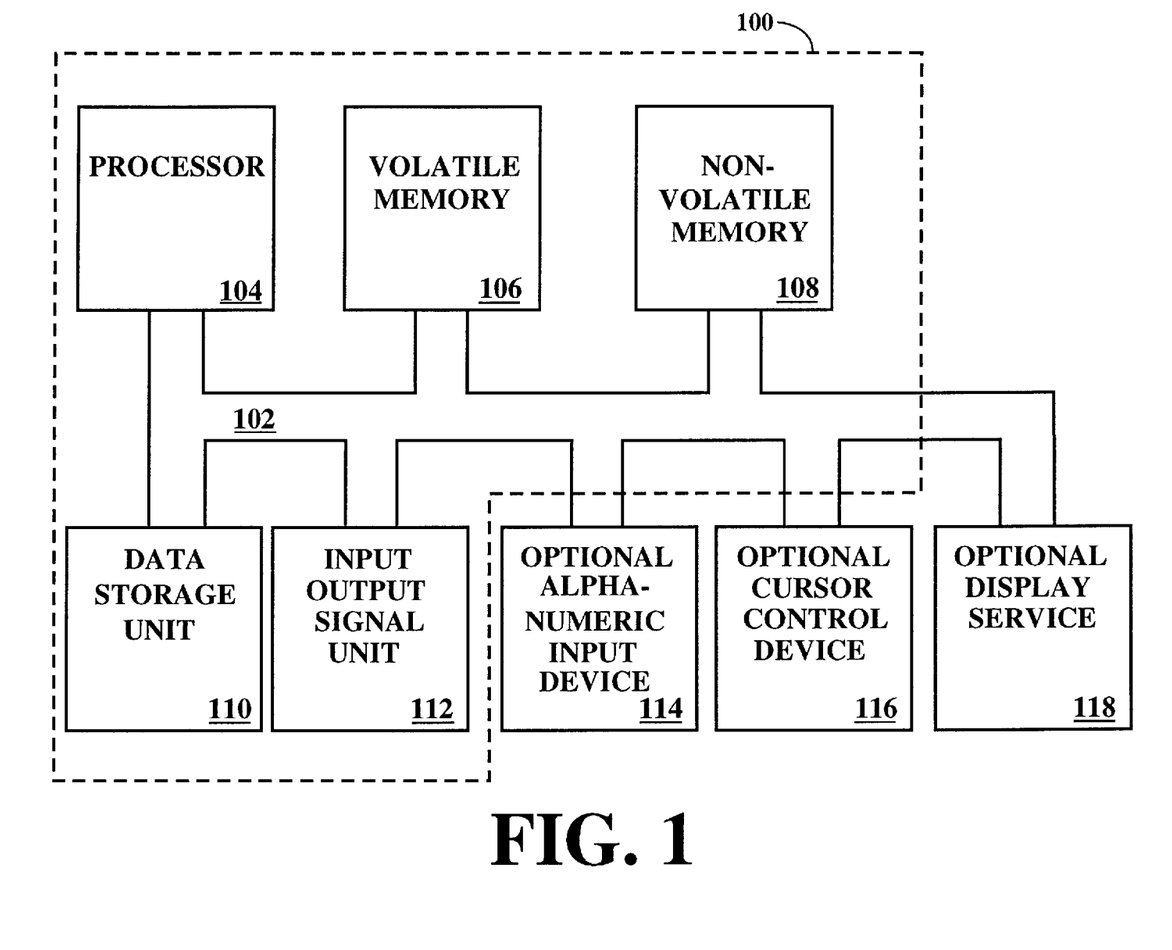
FIG. 1 is a logical representation of an exemplary computer system used in accordance with the present invention.

With reference now to FIG. 1, portions of the present server sizing system are comprised of computer-readable and computer-executable instructions which reside, for example, in computer-usable media of a computer system. FIG. 1 illustrates an exemplary computer system 100 used as a part of a server sizing system in accordance with one embodiment of the present invention. It is appreciated that system 100 of FIG. 1 is exemplary only and that the present invention can operate within a number of different computer systems including general purpose computers systems, embedded computer systems, and stand alone computer systems specially adapted for sizing server systems.

System 100 of FIG. 1 includes an address/data bus 102 for communicating information, and a central processor unit 104 coupled to bus 102 for processing information and instructions. System 100 also incudes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. A signal input output comm device 112 (e.g. a modem) coupled to bus 102 is also included in system 100 of FIG. 1. System 100 of the present server sizing system also includes an optional alphanumeric input device 114 including alphanumeric and function keys is coupled to bus 102 for communicating information and command selections to central processor unit 104. System 100 also optionally includes a cursor control device 116 coupled to bus 102 for communicating user input information and command selections to central processor unit 104.

System 100 of the present embodiment also includes an optional display device 118 coupled to bus 102 for displaying information.

Display device 118 of FIG. 1, utilized with the present server sizing system, may be a liquid crystal device, cathode ray tube, or other display device suitable for creating graphic images and alphanumeric characters recognizable to a user. Optional cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands. A more detailed discussion of the present server sizing system is found below.

GENERAL DESCRIPTION OF THE PRESENT SERVER SIZING SYSTEM

Figure 2:
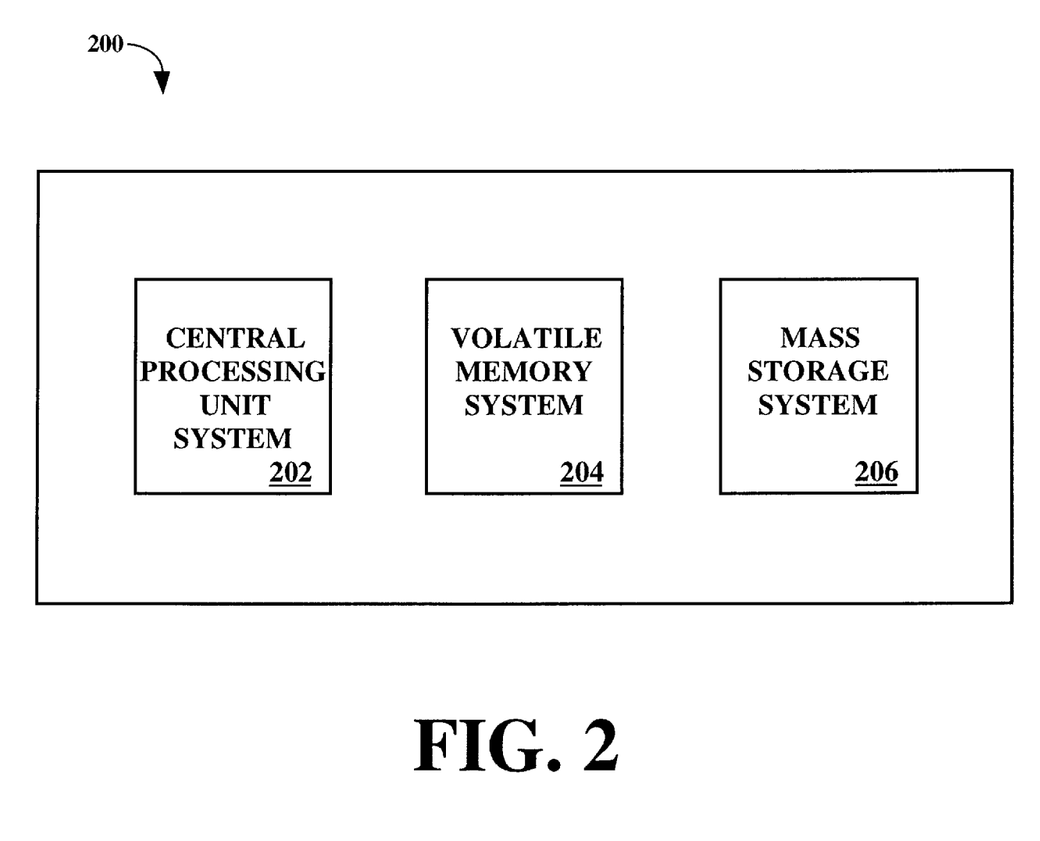
FIG. 2 is a logical representation of the components of an exemplary server system.

Referring now to FIG. 2, a schematic diagram illustrating components of an exemplary server system 200 is shown. As shown in FIG. 2, server system 200 includes a central processing unit (CPU) system 202, a volatile memory system (i.e. random access memory (RAM)) 204, and a mass storage system (e.g. hard disk capacity) 206. As mentioned above, the process of determining the appropriate size or hardware for each of systems 202, 204, and 206 is referred to as "sizing" of the server system.

Figure 3:
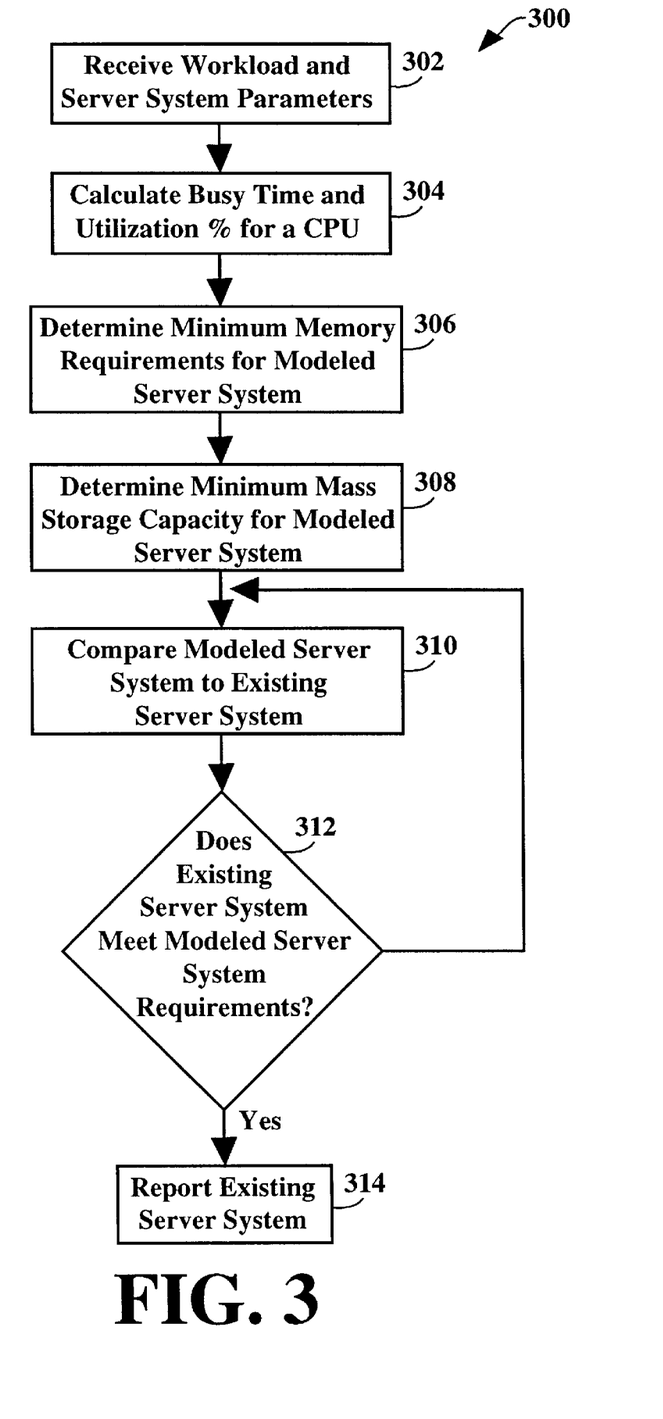
FIG. 3 is flow chart illustrating steps performed by the present server sizing system in accordance with the present invention.

With reference next to FIG. 3, a flow chart 300 of steps used by the present server sizing system is shown. Flow chart 300 includes processes of the present server sizing system which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control, for example, the operation and functioning of central processing unit 104 of FIG. 1.

With reference again to FIG. 3, in step 302 the present server sizing system receives anticipated performance parameters under which a server system is expected to operate. Typically, such anticipated performance parameters are provided by a user seeking to determine the appropriate size or hardware for a server system to meet that user's demands. In the present embodiment, the anticipated performance parameters include for example, the number of expected users of the server system, the expected database size, the expected fault tolerance, and the time window of operation for the server system. In the present embodiment, the time window is the anticipated peak utilization period. That is, the time period during which maximum use of the server system is expected to occur is used as the time window of operation of the server system. The present invention is also well suited to using other time windows of operation such as, for example, the length of the working day during which the server system is expected to be operated.

With reference still to step 302 of FIG. 3, the present invention also receives various anticipated workload information. Such information includes the number and type of transactions expected to occur during the time window of operation. Thus, if the server system is anticipated to be used for order entry, the present invention receives specific information about an order entry transaction, and the number of order entries which are expected to occur during the time window of operation. The specific information about the type of transaction includes, for example, the name of the transaction, the number of physical and logical reads used in the transaction, and the number of physical writes used in the transaction. As mentioned above, such anticipated workload parameters are typically provided by a user seeking to determine the appropriate size and hardware requirements for a server system.

As shown in step 304 of FIG. 3, the present invention uses the received anticipated parameter and workload information to determine the busy time of the server system. It will be understood that the busy time or "busy" of a server system indicates the time it takes to process a transaction. In the prior art, when attempting to determine the capacity or expected growth of an existing server system using traditional capacity planning techniques, the performance of the existing server system is monitored to empirically determine the busy time. However in the present invention, the server system does not yet exist; therefore, empirical historical data cannot be relied upon to determine the busy time. The present invention, however, provides a method for calculating the busy time of a modeled (i.e. not yet physically existing) server system.

With reference still to step 304, the busy time describes the time that it takes to process a transaction, plus any system overhead or compute time. In the present invention a typical transaction is broken down into reads and writes. A "read" represents the central processing unit (CPU) accessing stored data information residing either in cache memory or on a mass storage device such as, for example, a hard disk. A read out of cache memory is referred to as a logical read, while a read out of, for example, a hard disk, is referred to as a physical read. A "write" represents the central processing unit storing data information on a mass storage device such as, for example, a hard disk. Hence, writes are generally physical only. Each transaction also has a system overhead or compute time (CT) associate therewith. CT is a CPU and operating system dependent variable. CT is, more specifically, given by the product of the (total read time+total write time) and the compute factor (CF). CF relates to the time it takes for a transaction to occur. That is, a more difficult or complex transaction has a higher CF than a less difficult or simple transaction. Thus, CT is equal to (total read time+total write time)*(CF). In the present embodiment, the CPU is assumed to be a Pentium 100 Mhz processor produced by Intel Corporation of Santa Clara, Calif. The system is assumed to operate under a Windows NT operating system produced by Microsoft Corporation of Redmond, Wash. The present invention is, however, well suited to assuming that various other CPUs and operating systems are being used in the modeled server system. The busy time ($B_t$) for a single typical transaction to occur is then represented by the following equation:

$$B_t = \text{total read time} + \text{total write time} + CT \tag{1}$$

The ratio of physical reads ($R_p$) to logical reads ($R_l$) defines the "cache hit ratio" (CHR). For purposes of the busy time calculation of the present embodiment, the cache hit ratio is assumed to be 90 percent. The present invention calculates the memory needed to achieve a 90 percent CHR.

Although such a CHR is used in the present embodiment, the present invention is also well suited to using a various other cache hit ratio values. Thus, the total number of reads (R) can be broken into constituent physical reads ($R_p$) and logical reads ($R_l$) using the following expressions:

$$R_p = R*(1-CHR); \text{ and} \tag{2A}$$

$$R_l = R*CHR \tag{2B}$$

Additionally, each read and each write operation has a processor intervention time associated therewith. That is, a physical read ($R_p$) has a processor intervention time ($PTR_p$). Likewise, each logical read ($R_l$) has a processor intervention time ($PTR_l$). Similarly, each physical write ($W_p$) has a processor intervention time ($PTW_p$). Thus, equation (1) can be written as:

$$B_t = (R_p*PTR_p) + (R_l*PTR_l) + (W_p*PTW_p) + CT \tag{3}$$

Thus, the present invention determines the busy time for a single typical transaction to occur. The total number of transactions during the time window (T) is denoted as (TR). The total busy time ($B_T$) over the anticipated time window (T), i.e. peak utilization period, is given by:

$$B_T = B_t*TR \tag{4}$$

With reference still to step 304 of FIG. 3, the present invention also determines a utilization percentage of the modeled server system. The utilization percentage indicates the degree to which the CPU is being used. It is known that at utilization levels above a "maximum utilization value" the performance of the server system deteriorates rapidly. In the present invention, the maximum desired utilization is selected to be approximately 75 percent. Although such a maximum utilization value is selected in the present embodiment, the present invention is also well suited to selecting various other values as the maximum utilization value. As mentioned above, in the prior art, the performance of the existing server system is monitored to empirically determine values such as busy time or utilization. The present invention, however, provides a method for determining the generic utilization percentage of a modeled server system. Generic utilization ($U_g$) is given by:

$$U_g = B_T/T \tag{5}$$

Thus, by dividing the calculated total busy time $B_T$ by the time window T, the present invention determines the generic utilization percentage for a modeled server system. That is, the present invention is able to calculate a busy time and a utilization percentage for a given processor without physically constructing a server system. In so doing, the present invention eliminates the significant cost and time investment associated with the prior art wherein one or more server systems had to be built and tested in order to determine busy and utilization values. Thus, step 302 indicates the utilization percentage of a generic processor when subjected to a given workload under specified operating parameters.

Referring still to step 304, as mentioned above, the present invention assumes that the CPU is a Pentium 100 Mhz with a Windows NT operating system. Additionally, the present invention assumes that the CPU is perfectly scalable. That is, the present invention assumes that if one CPU performs 100 percent of an arbitrary workload, then two of the same CPUs will perform 200 percent of the same arbitrary workload, and then three of the same CPUs will perform 300 percent of the same arbitrary workload, and so on. Thus, if the generic utilization is 275 percent, then a minimum of three perfectly scalable CPUs is required. However, CPUs are not perfectly scalable. As a result, if one CPU performs 100 percent of an arbitrary workload, then two of the same CPUs will perform less than 200 percent of the same arbitrary workload, and then three of the same CPUs will perform less than 300 percent of the same arbitrary workload, and so on. More specifically, in one example, when one CPU performs 100 percent of an arbitrary workload, then two of the same CPUs will perform 166 percent of the same arbitrary workload, and then three of the same CPUs will perform 199 percent of the same arbitrary workload, and so on. Therefore, in such an example, with a workload of 200 percent 4 CPUs are necessary to handle the workload.

Referring still to step 304, the present invention provides a method for converting or scaling the generic utilization to an actual utilization ($U_a$). The present invention relates generic utilization to an actual utilization using the following expression:

$$U_g = aU_a^3 + bU_a^2 + cU_a + d \tag{6}$$

where the coefficients a, b, c, and constant d are CPU and operating system dependent factors. In the present embodiment, the coefficients are empirically determined for various CPUs with various operating systems. Thus, by determining the generic utilization using equation (5), and solving equation (6) for $U_a$, the present invention provides an actual scaled utilization for a modeled server system.

Additionally, by calculating the busy time and utilization, the present invention is also able to calculate queue length or the number of transactions which are waiting to be calculated in a server system. Queue length (Q) is given by:

$$Q = \text{Utilization}/(1-\text{Utilization}) \tag{7}$$

It will be understood that queue length can be calculated using either generic utilization or scaled utilization. By calculating busy time, utilization, and queue length, the present invention is able to determine conditions heretofore only available by examining an existing server system. These conditions are typically associated with prior art capacity planning techniques and include, throughput, service time, response time, and capacity.

Referring now to step 306, after the present invention has determined the generic utilization for the modeled server system, the present invention determines the minimum amount of memory required to operate the server system. In step 306, the present invention calculates the memory using the following expression:

$$\text{Minimum Memory} = \text{SYSTEM} + UM + SGA \tag{8}$$

where SYSTEM is the operating system and database application memory requirement, UM is the USER memory requirement, and SGA is the system global area memory requirement. As in CPU sizing step 304, in the present embodiment, anticipated memory requirements are provided by a user and may vary widely depending upon the needs and desired implementation of the user. In step 306 of the present invention, the user memory requirement is comprised of the required amount of user memory multiplied by the user count (i.e. number of users). Thus, the user memory, UM, requirement can be written as:

$$UM = (\text{memory per user})*(\text{number of users}) \tag{9}$$

Also, the SGA memory requirement is comprised of the shared pool size (SPS) memory requirement, the log buffer size (LBS), and the database buffer size (DBBS). In the present embodiment, the DBBS is given by:

$$DBBS=MF*(DBSIZE/DBBBS) \tag{10}$$

where DBSIZE is the database size, and DBBBS is the database block buffer size. By multiplying the right side of equation (10) by a multiplication factor (MF), the present invention provides a DBBS sufficiently large enough to insure a 90 percent cache hit ratio. In the present embodiment a default MF of 0.005 is used. Although a default MF factor of 0.005 is used to insure enough memory for a 90 percent cache hit ratio in the present embodiment, the present invention is also well suited to altering the default MF factor to reflect a cache hit ratio of other than 90 percent. The present invention is also well suited to having the MF entered by the user of the present invention. It can be seen that equation (8) can be rewritten as:

$$\begin{aligned}\text{Minimum Memory} \;=\;& \text{SYSTEM} + \\ & ((\text{memory per user})*(\text{number of users})) + \\ & MF*(DBSIZE/DBBBS)\end{aligned} \tag{11}$$

Again, anticipated DBSIZE and DBBBS requirements are provided by a user seeking to determine the appropriate size and hardware requirements for a server system. Thus, in step 306, the present invention determines the memory requirements for a modeled server system. Once again, the present invention eliminates the significant cost and time investment associated with the prior art wherein one or more server systems had to be built and tested in order to determine memory requirements.

With reference next to step 308, the present server sizing system also determines the mass storage capacity requirements for the modeled server system. In the present embodiment, the present server sizing system mandates that sufficient mass storage is provided to insure that the maximum mass storage media space usage does not exceed 85 percent of capacity. By using such a maximum space usage limit, the present invention insures space for future growth, peak utilization periods, and the quantity requirements to accommodate the expected input/output rate caused by the workload. The present invention is also well suited to varying the mass storage requirements to accommodate various other maximum or minimum space usage guidelines. In the present embodiment, and for purpose of the following equations, the mass storage media is comprised of one or more hard disks. It will be understood that the present server sizing system is also well suited to using various other types of mass storage.

In step 308, the required number of disks for the modeled server system is calculated as follows:

$$\text{NUMBER OF DISKS}=\text{maximum of } (D_{I/O}, D_{size}) \tag{12}$$

where $D_{I/O}$ is the number of disks required by the server system to accommodate the anticipated I/O load, and $D_{size}$ is the number of disks needed by the server system to accommodate the anticipated size of the database. Thus, the total number of disks required by the server system is given by the greater of $D_{I/O}$ and $D_{size}$. The $D_{I/O}$ is given by the physical I/O rate ($RIO_P$) associated with the anticipated workload divided by the allowable disk I/O rate (RD). Thus, $D_{I/O}$ can be expressed as:

$$D_{I/O}=RIO_P/RD \tag{13}$$

RD is given by the product of the maximum I/O rate ($RD_{max}$) for a particular type of disk, and the maximum acceptable utilization for the disk's I/O capacity ($F_{DIO}$). Again, the present embodiment selects a maximum utilization of 85 percent. Therefore, RD is written as:

$$RD=RD_{max}*F_{DIO} \tag{14}$$

Moreover, $RIO_P$ is given by the total physical I/Os during the time window (T) divided by time window (T). $RIO_P$ is given by:

$$RIO_P=IO_P/T \tag{15}$$

Referring still to step 308 of FIG. 3, $IO_P$ is given by:

$$IO_P=R_p+W_p \tag{16}$$

Where $R_p$ is the total physical reads during T, and $W_p$ is the total physical writes during T. $R_p$ can also be shown as:

$$R_p=R*(1-CHR) \tag{17}$$

where R is the total reads (physical and logical) generated by the workload during T, and CHR is the cache hit ratio. As mentioned above, in the present embodiment, a CHR of 90 is assumed.

The total physical writes $W_p$ is given by:

$$W_p=W*RWI \tag{18}$$

where W is the total writes during T and RWI is a RAID write increase (RWI) factor. RAID is an acronym for redundant array of inexpensive disks. A RAID storage approach is a method for achieving various levels of data integrity. Although a RWI factor is shown is equation (18), the present invention is also well suited for use in non-RAID systems.

The choice of RAID factor directly affects the amount of disk I/Os because different RAID factors change the number of writes to the disk. For example, RAID 1 doubles the number of writes of RAID 0. When a RAID 1 method is employed, a transaction having 50 reads and 10 writes in a RAID 0 approach is increased to a transaction which has 20 writes. Similarly, RAID 5 doubles the number of writes of a RAID 1 approach. When a RAID 5 method is employed, a transaction having 50 reads and 10 writes in RAID 0 is increased to a transaction which has 40 writes. Hence, the RWI for RAID 1 is 2, while the RWI for RAID 5 is 4. Therefore, equation (18) for a RAID 0, a RAID 1, and a RAID 5 method are respectively given by:

$$W_p=W*1 \tag{19A}$$

$$W_p=W*2 \tag{19B}$$

$$W_p=W*4 \tag{19C}$$

The number of disks required due to the database size ($D_{size}$) is given by:

$$D_{size}=DBsize/disksize/F_{Dsize} \tag{20}$$

where DBsize is the size of the database files, disksize is the capacity of each disk, and $F_{Dsize}$ is the disk size factor or maximum acceptable utilization of the disk's storage capacity. In the present embodiment, the $F_{Dsize}$ is selected to be 85 percent.

Thus, the number of required disks is given by the maximum of either the number of disks required as calculated in equation (20) or the number of disks calculated in equation (21) shown below:

$$\text{\# of disks}=(R(1-CHR)+(W*RWI)/T)/(RD_{max}*F_{DIO}) \tag{21}$$

As with CPU utilization and memory requirement steps 304 and 306, respectively, the present invention determines the mass storage requirements for a modeled server system in step 308. Once again, the present invention eliminates the significant cost and time investment associated with the prior art wherein one or more server systems had to be built and tested in order to determine mass storage requirements.

Referring now to step 310, the present invention compares the modeled server system, having a modeled utilization, a modeled memory requirement, and a modeled mass storage capacity, to an existing server system. In the present embodiment, a list of currently available "off-the-shelf" server systems is stored, for example, in data storage unit 110 of FIG. 1. Specifications for each of the "off-the-shelf" systems are also stored in data storage unit 110. The specifications include, for example, the type and number of CPU(s) present in the existing server system, the operating system of the CPU(s), the available memory, and the mass storage capacity for each of the existing server systems. Although multiple existing server systems are stored in data storage unit 110 of FIG. 1 in the present embodiment, the present invention is also well suited to comparing the modeled server system to only a specific server system.

Referring still to step 310, the present invention employs equation (6) to convert the perfectly scalable Pentium 100 Mhz with a Windows NT operating system to the CPU(s) and operating system of the existing server system. That is, the numeric value of coefficients a, b, c, and constant d of equation (6) for the existing CPU are placed into equation (6), and equation (6) is then solved for $U_a$.

Figure 4:
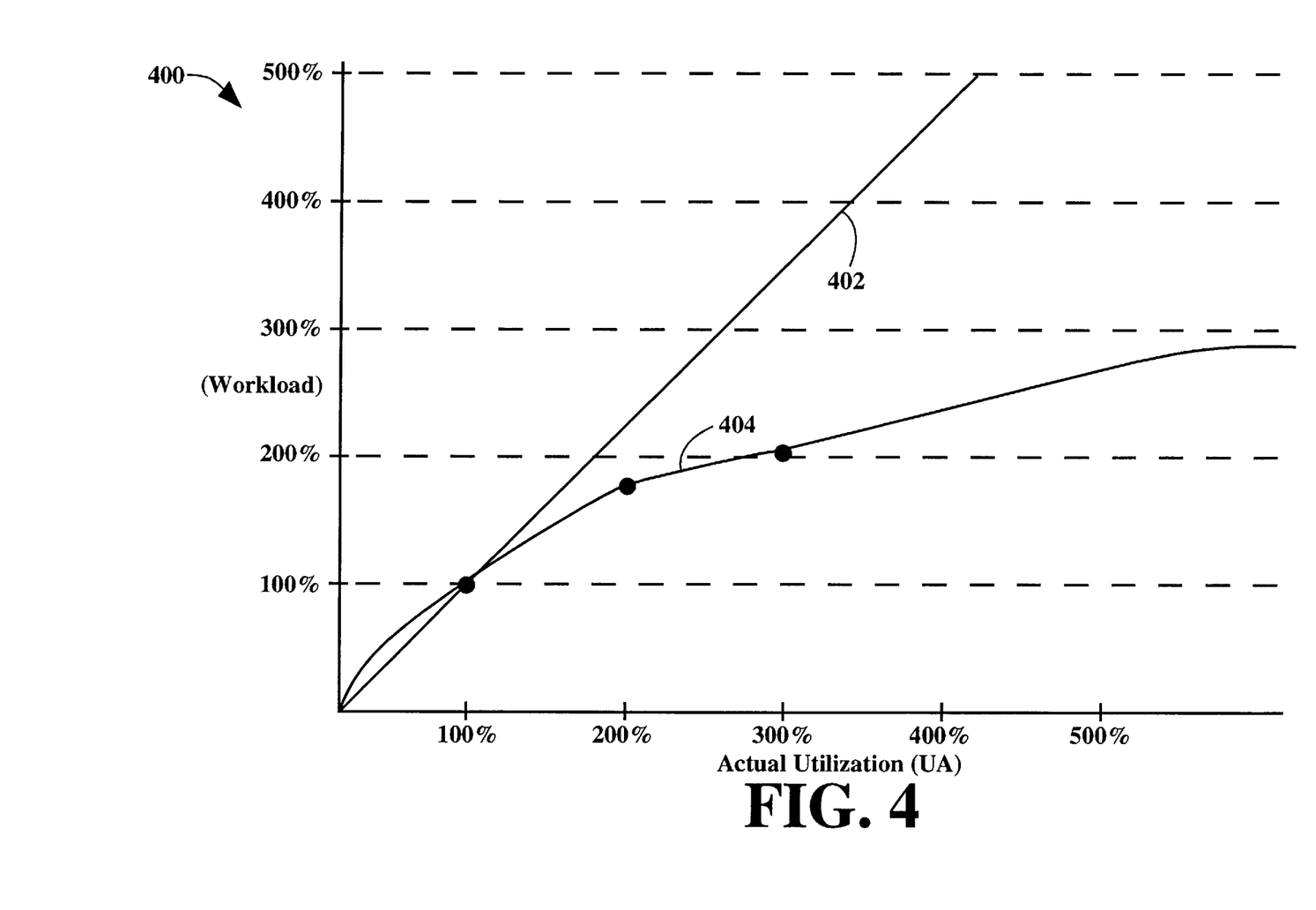
FIG. 4 is a graph correlating a workload to an actual utilization in accordance with the present invention.

With reference now to FIG. 4, a graph 400 correlating a workload to an actual utilization is shown. More specifically, equation (6) converts straight line 402 to a nonlinear curve 404. Line 402 of FIG. 4 represents the generic CPU used in the calculations of the present server sizing system. As shown in graph 400, line 402 is linear and shows that for a workload of 100 percent, the perfectly scalable CPU has a 100 percent utilization. Likewise, for a workload of 200 percent, the perfectly scalable CPU will operate at a 200 percent utilization. As a result, two of the perfectly scalable CPUs each operating at 100 percent utilization will be able to handle the workload. Furthermore, for a workload of 300 percent, the perfectly scalable CPU will operate at a 300 percent utilization. As a result, three of the perfectly scalable CPUs each operating at 100 percent utilization will be able to handle the workload. As mentioned above, CPUs are not perfectly scalable. Line 404 shows an example of a scaled or actual utilization. Line 404 shows that one brand X CPU with brand Y operating system performs 100 percent of an arbitrary workload. However, at a 200 percent utilization (i.e. when two of the same CPUs each operate at 100 percent utilization) the two CPUs only perform 166 percent of a workload. Similarly, at a 300 percent utilization (i.e. when three of the same CPUs each operate at 100 percent utilization) the three CPUs only perform 199 percent of a workload. Thus, in the embodiment of FIG. 4, in order achieve a workload of 200 percent, 4 CPUs are necessary. Thus, instead of needing the 2 generic CPUs, the present server system would actually need 4 brand X CPUs on a system using brand Y operating system.

With reference still to step 310, the present invention also requires that each CPU has a maximum utilization of 75 percent. As mentioned above, at CPU utilization levels above 75 percent, the performance of the server system deteriorates rapidly. Therefore, after determining the generic utilization i.e. workload, the present invention then examines an existing server system stored in data storage unit 110 of FIG. 1. Using equation (6), the present invention determines the actual utilization of the CPU subsystem of the existing server system. If, for example, the actual utilization to perform a workload is 300 percent, three of the existing CPUs operating at 100 percent utilization each are required to perform the workload. However, because the present invention limits the actual utilization to less than 75 percent for each CPU, four of the existing CPUs each operating at a 75 percent utilization are required to perform the workload. Thus, if the existing system does not have at least four CPUs, the existing server system does not meet the processor requirements of the modeled server system. If, on the other hand, the existing server system does have four or more CPUs, then the existing server system is said to meet the CPU requirements of the modeled server system.

With reference still to step 310, the present invention also determines whether the existing server system has sufficient memory to meet the requirements of the modeled server system. As an example, if the modeled server system requires 200 megabytes (MB) of RAM, and the existing system does not have a capacity of at least 200 MB of RAM, the existing server system does not meet the memory requirements of the modeled server system. If, on the other hand, the existing server system does have a capacity of 200 MB or more of RAM, then the existing server system is said to meet the memory requirements of the modeled server system. Additionally, as mentioned above, the memory requirements of the modeled server system are selected such that a 90 percent cache hit ratio is achieved.

With reference still to step 310, the present invention also determines whether the existing server system has sufficient hard disk capacity to meet the requirements of the modeled server system. As an example, if the modeled server system requires 2 gigabytes (GB) of hard disk space, and the existing system does not have a capacity of at least 2 GB of hard disk space, the existing server system does not meet the hard disk requirements of the modeled server system. If, on the other hand, the existing server system does have a capacity of 2 GB or more of hard disk space, then the existing server system is said to meet the hard disk requirements of the modeled server system. Additionally, as mentioned above, the hard disk capacity requirements of the modeled server system are selected such that a maximum usage of 85 percent is achieved.

Referring now to steps 312 and 314, if the existing server system meets the CPU, memory, and mass storage requirements of the modeled server system, the name and specifications of the "off-the-shelf" existing server system is reported by the present invention. In the present embodiment, if the existing server system meets the requirements of the modeled server system, the name of the existing server system is displayed on optional display device 118 of FIG. 1. The present invention is well suited to using various other methods to report the name and specifications of the existing server system which meets the requirements of the modeled server system.

In the present embodiment, if the existing server system does not meet the requirements of the modeled server system, the present invention returns to step 310 and compares the modeled server system to yet another stored existing server system. In the present embodiment, the above process is repeated until an existing server system is found which meets the requirements of the modeled server system, or until all of the stored existing server system have compared to the modeled server system. The present invention is, however, well suited to various other reporting and comparing approaches. For example, the present invention is well suited to ranking the stored existing server systems in order of their compliance with the requirements of the modeled server system. The present invention is also well suited to reporting only the most cost effective of the stored existing server systems which meet the requirements of the modeled server system. The present invention is also well suited to reporting the level of compliance of each of the stored existing server systems with the requirements of the modeled server system.

Hence, the present invention eliminates the significant cost and time investment associated with prior art sizing systems wherein one or more server systems had to be physically built and tested in order to determine CPU, memory, and mass storage requirements. Although the above description explicitly recites using the present invention to size a server system, the present invention is also well suited for sizing of various other types of computer systems.

Thus, the present invention provides a computer system and method which inexpensively determines performance characteristics of a particular server system without requiring the construction of that particular server system, and which does not require extensive consultant review of numerous currently operating server systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. In a computer system, a method for modeling the processing capability required to perform a selected workload said method comprising the computer implemented steps of:

calculating the busy time for a first central processing unit subjected to a selected workload, said step of calculating said busy time for said central processing unit further comprising the steps of:

a) calculating the time required for said first central processing unit to perform a total number of reads necessary to perform a transaction;

b) calculating the time required for said first central processing unit to perform a total number of writes necessary to perform said transaction;

c) calculating the compute time for said first central processing unit to perform said total number of reads and writes for said transaction; and d) summing the calculated times from steps a) through c);

using said calculated busy time to determine a utilization percentage for said first central processing unit subjected to said selected workload; and determining whether said first central processing unit is able to operate satisfactorily when subjected to said selected workload.

2. The method for modeling the processing capability require to perform a selected workload as recited in claim 1 wherein said step of using said calculated busy time to determine a utilization percentage for said first central processing unit subjected to said selected workload comprises the computer implemented steps of:

e) determining the time period over which said transaction can occur; and f) dividing said summed calculated times from step d) by said time period of step e).

3. The method for modeling the processing capability required to perform a selected workload as recited in claim 1 wherein said step of determining a utilization percentage for a first central processing unit comprises the computer implemented step of:

determining a utilization percentage for a plurality of said first central processing units subjected to said selected workload.

4. The method for modeling the processing capability required to perform a selected workload as recited in claim 1 wherein said step of determining whether said first central processing unit is able to operate satisfactorily when subjected to said selected workload comprises the computer implemented steps of:

comparing said modeled computer system equipped with said first central processing unit and subjected to said selected workload to an existing computer system having a second central processing unit;

scaling said utilization percentage of said first central processing unit to provide a utilization percentage for said second central processing unit when said second central processing unit is subjected to said selected workload; and determining whether said utilization percentage of said existing computer system when subjected to said selected workload is less than a selected limit.

5. The method for modeling the processing capability required to perform a selected workload as recited in claim 4 comprising the computer implemented step of:

determining whether said utilization percentage of said existing computer system when subjected to said selected workload is less than 75 percent of complete utilization.

6. The method for modeling the processing capability required to perform a selected workload as recited in claim 4 comprising the computer implemented step of:

comparing said modeled computer system equipped with said first central processing unit and subjected to said selected workload to a plurality of said existing computer systems, each of said plurality of existing computer systems having a respective central processing unit.

7. In a computer system, a method for modeling the size of a server system, said method comprising the computer implemented steps of:

determining a utilization percentage for a first central processing unit subjected to a selected workload, said determination of said utilization percentage comprising the step of:

calculating the busy time for a first central processing unit subjected to a selected workload, said step of calculating said busy time for said first central processing unit further comprising the steps of:

a) calculating the time required for said first central processing unit to perform a total number of reads necessary to perform a transaction;

b) calculating the time required for said first central processing unit to perform a total number of writes necessary to perform said transaction;

c) calculating the compute time for said first central processing unit to perform said total number of reads and writes for said transaction; and d) summing the calculated times from steps a) through c);

calculating the minimum amount of memory required by a modeled computer system subjected to said selected workload, wherein said modeled computer system is equipped with said first central processing unit; and calculating mass storage requirements for said modeled computer system equipped with said first central processing unit and subjected to said selected workload.

8. The method for modeling the size of a computer system as recited in claim 7 wherein said step of calculating the minimum amount of memory comprises the computer implemented step of:

calculating the minimum amount of memory required by said modeled computer system equipped with said first central processing unit and subjected to said selected workload wherein said modeled computer system is has a 90 percent cache hit ratio.

9. The method for modeling the size of a computer system as recited in claim 7 wherein said step of calculating the mass storage requirements comprises the computer implemented step of:

calculating mass storage requirements for said modeled computer system equipped with said first central processing unit and subjected to said selected workload wherein said mass storage is filled to less than 85 percent of capacity.

10. The method for modeling the size of a computer system as recited in claim 7 wherein said step of determining a utilization percentage for a first central processing unit comprises the computer implemented step of:

determining a utilization percentage for a plurality of said first central processing units subjected to said selected workload.

11. The method for modeling the size of a computer system as recited in claim 7 wherein said step of calculating mass storage requirements for said computer system comprises the computer implemented step of:

calculating hard disk capacity requirements for said modeled computer system equipped with said first central processing unit and subjected to said selected workload.

12. The method for modeling the size of a computer system as recited in claim 8 comprising the computer implemented steps of:

comparing said modeled computer system equipped with said first central processing unit and subjected to said selected workload to an existing computer system having memory capacity, mass storage capacity, and a second central processing unit;

determining whether said memory capacity of said existing computer system exceeds said minimum amount of memory required by said modeled computer system equipped with said first central processing unit and subjected to said selected workload;

determining whether said mass storage capacity of said existing computer system exceeds said mass storage requirements of said modeled computer system equipped with said first central processing unit and subjected to said selected workload;

scaling said utilization percentage of said first central processing unit to provide a utilization percentage for said second central processing unit when said second central processing unit is subjected to said selected workload; and determining whether said utilization percentage of said existing computer system when subjected to said selected workload is less than a selected limit.

13. The method for modeling the size of a computer system as recited in claim 12 comprising the computer implemented step of:

determining whether said utilization percentage of said existing computer system when subjected to said selected workload is less than 75 percent of complete utilization.

14. The method for modeling the size of a computer system as recited in claim 12 comprising the computer implemented step of:

comparing said modeled computer system equipped with said first central processing unit and subjected to said selected workload to a plurality of said existing computer systems, each of said plurality of existing computer systems having respective memory capacity, mass storage capacity, and a central processing unit.

15. A computer system comprising:

a processor;

an address/data bus coupled to said processor;

a computer readable memory coupled to communicate with said processor, said processor for performing the computer system sizing steps of:

receiving selected workload information, said workload information indicating expected performance requirements for a modeled computer system;

calculating the busy time for a first central processing unit subjected to said selected workload said step of calculating said busy time for a first central processing unit further comprising the steps of a) calculating the time required for said first central processing unit to perform a total number of reads necessary to perform a transaction;

b) calculating the time required for said first central processing unit to perform a total number of writes necessary to perform said transaction;

c) calculating the compute time for said first central processing unit to perform said total number of reads and writes for said transaction; and d) summing the calculated times from steps a) through c);

determining a utilization percentage for said first central processing unit subjected to said selected workload;

calculating the minimum amount of memory required by said modeled computer system subjected to said selected workload, wherein said modeled computer system is equipped with said first central processing unit; and calculating mass storage requirements for said modeled computer system equipped with said first central processing unit and subjected to said selected workload;

comparing said modeled computer system equipped with said first central processing unit and subjected to said selected workload to an existing computer system having memory capacity, mass storage capacity, and a second central processing unit; and reporting whether said existing computer system would be able to adequately operate at said expected performance requirements.

16. The computer system as recited in claim 15 wherein said processor performs the computer sizing steps of:

determining whether said memory capacity of said existing computer system exceeds said minimum amount of memory required by said modeled computer system equipped with said first central processing unit and subjected to said selected workload;

determining whether said mass storage capacity of said existing computer system exceeds said mass storage requirements of said modeled computer system equipped with said first central processing unit and subjected to said selected workload;

scaling said utilization percentage of said first central processing unit to provide a utilization percentage for said second central processing unit when said second central processing unit is subjected to said selected workload; and determining whether said utilization percentage of said existing computer system when subjected to said selected workload is less than a selected limit.

17. The computer system as recited in claim 15 wherein said processor performs the computer sizing steps of:

comparing said modeled computer system equipped with said first central processing unit and subjected to said selected workload to a plurality of said existing computer systems, each of said plurality of existing computer systems having respective memory capacity, mass storage capacity, and a central processing unit; and reporting whether any of said plurality of existing computer system would be able to adequately operate at said expected performance requirements.

18. The computer system as recited in claim 15 wherein said processor performs the computer sizing steps of:

determining whether said utilization percentage of said existing computer system when subjected to said selected workload is less than 75 percent of complete utilization.

19. The computer system as recited in claim 15 wherein said processor performs said step of determining a utilization percentage for said first central processing unit subjected to said selected workload by:

e) determining the time period over which said transaction can occur;

f) dividing said summed calculated times from step d) by said time period of step e).

20. The computer system as recited in claim 15 wherein said processor performs said step of calculating the minimum amount of memory required by said modeled computer system subjected to said selected workload by:

calculating the minimum amount of memory required by said modeled computer system equipped with said first central processing unit and subjected to said selected workload wherein said modeled computer system is has a 90 percent cache hit ratio.

21. The computer system as recited in claim 15 wherein said processor performs said step of calculating the mass storage requirements of said modeled computer system subjected to said selected workload by:

calculating mass storage requirements for said modeled computer system equipped with said first central processing unit and subjected to said selected workload wherein said mass storage is filled to less than 85 percent of capacity.

22. A computer-usable medium having computer-readable program code embodied therein for causing a computer to perform the steps of:

determining a utilization percentage for a first central processing unit subjected to a selected workload, said determination of said utilization percentage comprising the step of:

calculating the busy time for said first central processing unit subjected to said selected workload, said busy time calculated by performing the steps of:

a) determining the time period over which a transaction can occur;

b) calculating the time required for said first central processing unit to perform a total number of reads necessary to perform said transaction;

c) calculating the time required for said first central processing unit to perform a total number of writes necessary to perform said transaction;

d) calculating the compute time for said first central processing unit to perform said total number of reads and writes for said transaction; and e) summing the calculated times from steps b) through d); and f) dividing said summed calculated times from step e) by said time period of step a);

calculating the minimum amount of memory required by a modeled computer system subjected to said selected workload, wherein said modeled computer system is equipped with said first central processing unit; and calculating mass storage requirements for said modeled computer system equipped with said first central processing unit and subjected to said selected workload.

23. The computer-usable medium as recited in claim 22 wherein said computer-readable program code embodied therein causes a computer to perform the step of:

calculating the minimum amount of memory required by said modeled computer system equipped with said first central processing unit and subjected to said selected workload wherein said modeled computer system is has a 90 percent cache hit ratio.

24. The computer-usable medium as recited in claim 22 wherein said computer-readable program code embodied therein causes a computer to perform the step of:

calculating mass storage requirements for said modeled computer system equipped with said first central processing unit and subjected to said selected workload wherein said mass storage is filled to less than 85 percent of capacity.

25. The computer-usable medium as recited in claim 22 wherein said computer-readable program code embodied therein causes a computer to perform the step of:

determining a utilization percentage for a plurality of said first central processing units subjected to said selected workload.

26. The computer-usable medium as recited in claim 22 wherein said computer-readable program code embodied therein causes a computer to perform the step of:

calculating hard disk capacity requirements for said modeled computer system equipped with said first central processing unit and subjected to said selected workload.

27. The computer-usable medium as recited in claim 22 wherein said computer-readable program code embodied therein causes a computer to perform the steps of:

comparing said modeled computer system equipped with said first central processing unit and subjected to said selected workload to an existing computer system having memory capacity, mass storage capacity, and a second central processing unit;

determining whether said memory capacity of said existing computer system exceeds said minimum amount of memory required by said modeled computer system equipped with said first central processing unit and subjected to said selected workload;

determining whether said mass storage capacity of said existing computer system exceeds said mass storage requirements of said modeled computer system equipped with said first central processing unit and subjected to said selected workload;

scaling said utilization percentage of said first central processing unit to provide a utilization percentage for said second central processing unit when said second central processing unit is subjected to said selected workload; and determining whether said utilization percentage of said existing computer system when subjected to said selected workload is less than a selected limit.

28. The computer-usable medium as recited in claim 27 wherein said computer-readable program code embodied therein causes a computer to perform the steps of:

determining whether said utilization percentage of said existing computer system when subjected to said selected workload is less than 75 percent of complete utilization.

29. The computer-usable medium as recited in claim 27 wherein said computer-readable program code embodied therein causes a computer to perform the steps of:

comparing said modeled computer system equipped with said first central processing unit and subjected to said selected workload to a plurality of said existing computer systems, each of said plurality of existing computer systems having respective memory capacity, mass storage capacity, and a central processing unit.

* * * * *

UNITED STATES PATENT AND TRADEMARK OFFICE
CERTIFICATE OF CORRECTION

| | | |
|---|---|---|
| PATENT NO. | : 5,848,270 | Page 1 of 1 |
| APPLICATION NO. | : 08/692077 | |
| DATED | : December 8, 1998 | |
| INVENTOR(S) | : Steven A. DeLuca and Andrew Rist | |

It is certified that error appears in the above-identified patent and that said Letters Patent is hereby corrected as shown below:

In claim 2, column 13, line 63
Please delete "require" and insert -- required --.

In claim 8, column 15, line 17
Please delete "is".

In claim 12, column 15, line 45
Please delete "claim 8" and insert -- claim 7 --.

In claim 20, column 17, line 50
Please delete "is".

In claim 23, column 18, line 22
Please delete "is".

Signed and Sealed this
Twenty-eighth Day of February, 2012

David J. Kappos
*Director of the United States Patent and Trademark Office*